April 22, 1958     G. O. UDDENBERG ET AL     2,831,478
APPARATUSES FOR OBSERVING AND MEASURING OF
PRESSURES WITHIN ORGANS OF THE HUMAN BODY
Filed Oct. 31, 1955
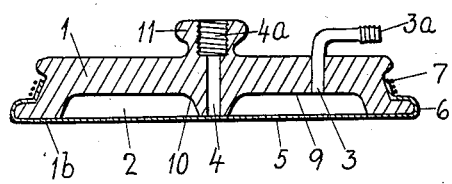
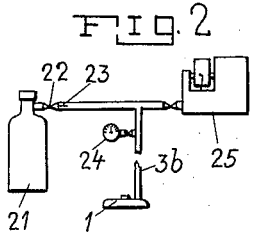
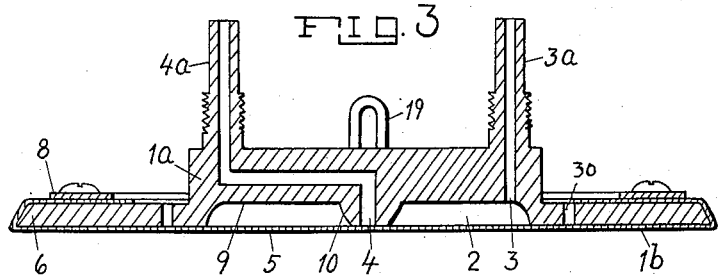
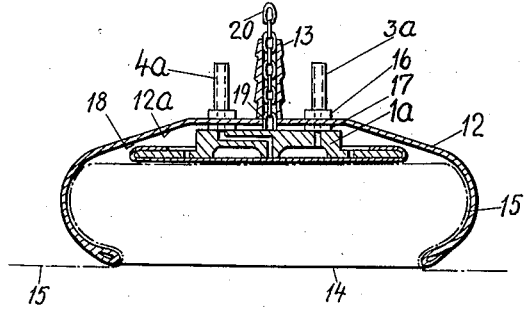
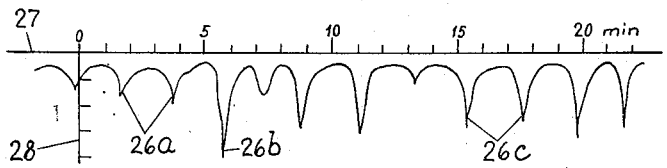
INVENTORS
G. O. Uddenberg
H. A. Thorén
By Glascock Downing Seebold
ATTYS.

United States Patent Office 2,831,478
Patented Apr. 22, 1958

2,831,478

APPARATUSES FOR OBSERVING AND MEASURING OF PRESSURES WITHIN ORGANS OF THE HUMAN BODY

Göran Olof Uddenberg and Herbert Alfred Thorén, Gothenburg, Sweden

Application October 31, 1955, Serial No. 543,956

Claims priority, application Sweden April 30, 1955

4 Claims. (Cl. 128—2)

This invention relates to certain novel improvements in apparatuses for observing and measuring of pressures within organs of the human body.

It is of great value for the medical treatment of the human body to be able to state and measure pressures within organs of the body, for instance, the pressures which cause pain during childbirth.

The main object of the invention is to provide a device which is capable of working in a pressing position on the organ without piercing the covering thereof.

Another object of the invention is to provide a device which is capable of working, at childbirth, in a pressing position directly on the skin without causing any injury.

A further object of the invention is to provide a device which is capable of working, at childbirth, in position on the child's head.

A further object of the invention is to provide a device which is able to measure and register the pressure variations within human organs.

With these and further objects in view the invention consists of an apparatus having a pressure plate with a preferably smooth under surface adapted to be pressed against the organ, the plate being provided with a chamber with connection means for a pressure medium source, preferably compressed air, and connection means for a pressure measuring instrument, the chamber opening out through the under surface and being provided with a separate outlet, the inner mouth of the outlet lying in the opening substantially in the plane of the under surface.

The invention will be best understood by reference to the accompanying drawing showing a preferred construction exemplified to be used at childbirths, and in which:

Figure 1 is a longitudinal sectional view of the apparatus in one embodiment,

Figure 2 a diagrammatical view of the apparatus in coaction with additional implements for carrying out the pressure measuring function, Figure 3 is a longitudinal section of a further embodiment of the apparatus in more constructive execution, Figure 4 illustrates the latter apparatus in minor scale and in combination with a suction cup intended for use with a releasing apparatus at childbirths, and Figure 5 is a pressure diagram registered during the use of the apparatus at a childbirth.

The apparatus consists of a pressure plate 1 of suitable circular shape. The pressure plate has a smooth under surface 1b and is provided with a cuplike chamber 2 opening out through the under surface, which chamber is intended to be filled up with a pressure medium, preferably compressed air. The chamber is provided with an inlet 3 and an outlet 4 for the compressed air and with connection means 3a, 4a for additional pipings. The opening of the chamber is, in the shown embodiments, covered by a membrane 5 of springy and elastic material such as rubber and the like. The membrane lying close to the under surface may be held in position in any suitable manner for instance, by a rubber band 7 (Fig. 1) or by a plate ring 8 (Fig. 3), after being folded around the outer flange edges 6 of the pressure plate. The inner mouth of the outlet 4 for the chamber 2 opposes the membrane and lies at the free lower end of a protrusion 10 from the ceiling 9 of the chamber, and the outlet mouth is positioned in the same plane as the under surface so that the membrane will normally close the outlet mouth. The end surface of the protrusion is suitably curved towards the mouth opening, as seen in Figures 1 and 3.

In the embodiment of Figure 1 the apparatus is provided at the upper surface with a central grip 11 through which the outlet 4 opens out, and by which the apparatus may be pressed with the membrane against the skin of the stomach of a patient in childbirth and be retained in position in a simple manner for instance, by means of an adhesive plaster.

The air inlet 3 is, in use, to be connected by a pipe 3b with a source of compressed air, for instance an air container 21. The air pipe has a shut-off valve 22 close to the air container and is here also provided with a narrow passage, for instance, in the shape of a nozzle 23 or a needle valve, so that the air will stream through in a thin jet when the shut-off valve is open. An air pressure meter 24 is inserted in the piping and for an automatic registering of the pressure variations it is suitable to connect a corresponding apparatus, for instance, a barograph 25 which in known manner draws up a pressure curve on a registering band.

The embodiment of the apparatus shown in Figures 3 and 4 is combined with a suction cup 12, the latter having a central tube stud 13 for a rubber hose to be connected to a vacuum pump (not shown) in order to obtain reduced pressure within the cup. This suction cup is intended to be placed with the suction opening 14 against a child's head during childbirth to adhere to the scalp of the head and permit the head to be subjected to a drawing force, thus facilitating the childbirth. The suction cup in this case is preferably of stiff material, such as metal, and resembles our U. S. Patent 2,702,038 in that it has a narrowed suction mouth with the cup walls directed outwards from the mouth. The scalp 15 of the child's head, sucked into the cup under influence of the reduced air pressure, will fold outwards around the edges of the cup mouth to take the shape of a widened bladder, the tightening pressure against the mouth edges contributing to a strong adhering of the cup to the scalp. The pressure measuring apparatus is positioned at the bottom 12a of the suction cup with tube studs 3a, 4a reaching through the bottom wall and secured by outer nuts 16, the tightening against air being obtained by plates 17 of rubber or like material between the cup bottom and the apparatus. Between the outer edge of the apparatus and the cup wall is a space 18 serving as a passage for the air suction to the cup room, and the scalp sucked into the cup will come to lie close to the membrane of the apparatus. The apparatus has a central hook 19 opposing the central tube stud 13 and a chain 20 is connected to the hook and drawn through the stud to serve as a draw grip during the use of the suction cup. Safety-holes 30 are indicated in the pressure apparatus as a way out for the air if the the pressure is too high.

In use the apparatus is placed on the skin of the stomach of the patient or, when combined with the suction cup, on the head of the child during childbirth. Figure 5 illustrates the latter case. The compressed air is released through the valve 22 and streams through the nozzle 23 to the chamber 2 to increase the pressure in this chamber and thereafter to pass out through the outlet mouth 4 as soon as the pressure within the chamber reaches and rises above the pressure of the patient's skin against the membrane. As long as the pressure of the skin is constant the registering band shows a horizontal pressure line. If pain arises because of the increasing muscle pressure the membrane is pressed against the outlet mouth by the skin and the through-streaming of the air is stopped until the pressure within the chamber is raised to the same pressure as the skin pressure and then the air will again begin to ooze out between the membrane and the outlet. The new pressure will be registered on the band as a downdirected peak. As the pain at birth is composed of a number of pressure pushes interrupted by relaxing moments the result on the register band indicated in Figure 5 will appear as a number of peaks connected by zero-lines. The latter, on referring to a time-scale 27, will indicate the time between moments of pain. If the drum for the band is driven by a clockwork, as usually is the case, the time periods between the moments of pain will be exactly indicated. The shorter peaks 26a on the register band indicate the muscle pressures on a scale 28 during the moments of pain. At 26b a drawing force begins to be intermittently applied to the suction cup, increasing the height of the pressure peaks, and from the point 26c the drawing force is used for every moment of pain. Shortly thereafter the releasing takes place.

By registering with the pressure measuring apparatus it is possible to determine the degree of difficulty at childbirth and to use the aid of the suction cup at the proper time. Therein lies also the advantage of the combination of the pressure measuring apparatus with the suction cup. It has been stated that the pressure registering in the manner explained above is sensitive to such a degree that it is possible to observe the beginning of a pain period before the patient becomes aware thereof, and this will facilitate the use of the suction cup at the proper time.

The invention is not limited to the use solely for childbirths but may be used for pressure testing of other human organs directly accessible or lying within the human body which are covered by skin, cuticles, pellicles and such like. As an example, the human eye may be mentioned where certain tensions can be measured by the apparatus.

As the human skin or an organ covering is in itself of elastic nature it is also possible to use the apparatus without an artificial membrane, in which case the human skin or the organ covering serves as a membrane when the apparatus is pressed thereupon. This is the most simplified embodiment of the apparatus and is possible as the inner mouth of the air outlet lies in the same plane as the under surface of the apparatus. If an artificial membrane is used the under surface of the pressure plate must be straight, but in the other case the under surface may be curved if desired.

While we have illustrated and described the preferred form of construction for carrying our invention into effect, it is capable of variation and modification, without departing from the spirit of the invention. We, therefore, do not wish to be limited to the precise details of construction set forth, but desire to avail ourselves of such variations and modifications as come within the scope of the appended claims.

Having thus described our invention what we claim as new and desire to protect by Letters Patent is:

1. An apparatus for observing and measuring of development of pressures within closed human organs for instance at childbirths consisting of a pressure plate having an under surface adapted to be pressed against the organ, the plate being provided with a room with connection means for a pressure medium source preferably air and connection means for a pressure measuring instrument, the room opening out through the under surface and being provided with a separate outlet, the inner mouth of the outlet lying in the opening substantially in the plane of the under surface.

2. An apparatus for observing and measuring of development of pressures within closed human organs for instance at childbirths consisting of a pressure plate having a straight under surface adapted to be pressed against the organ, the plate being provided with a room with connection means for a pressure medium source preferably air and connection means for a pressure measuring instrument, the room opening out through the under surface and being provided with a separate outlet, the inner mouth of the outlet lying in the opening substantially in the plane of the under surface, the opening of the room being covered by an elastic membrane.

3. An apparatus for observing and measuring of development of pressures within closed human organs for instance at childbirths consisting of a pressure plate having a straight under surface adapted to be pressed against the organ, the plate being provided with a room with connection means for a pressure medium source preferably air and connection means for a pressure measuring instrument including a pressure registering apparatus, the room opening out through the under surface and being provided with a separate outlet, the inner mouth of the outlet lying in the opening substantially in the plane of the under surface, the opening of the room being covered by an elastic membrane.

4. An apparatus for observing and measuring of development of pressures within closed human organs for instance at childbirths consisting of a pressure plate having a straight under surface adapted to be pressed against the organ, the plate being provided with a room with connection means for a pressure medium source preferably air and connection means for a pressure measuring instrument including a pressure registering apparatus, the room opening out through the under surface and being provided with a separate outlet, the inner mouth of the outlet lying in the opening substantially in the plane of the under surface, the opening of the room being covered by an elastic membrane, the pressure plate being combined with a suction cup preferably of stiff material as for instance metal with a narrowed suction mouth and serving as a releasing apparatus for childbirths in attaching position on the child's head, the pressure plate being placed within the suction cup opposing the suction mouth of the cup.

References Cited in the file of this patent

UNITED STATES PATENTS

| | | |
|---|---|---|
| 2,223,827 | Kevelson et al. | Dec. 3, 1940 |
| 2,239,330 | Lorand | Apr. 22, 1941 |